Sept. 24, 1963  J. W. KAPPEN  3,104,910
MATERIAL HANDLING MECHANISM
Filed Sept. 1, 1960  5 Sheets-Sheet 1
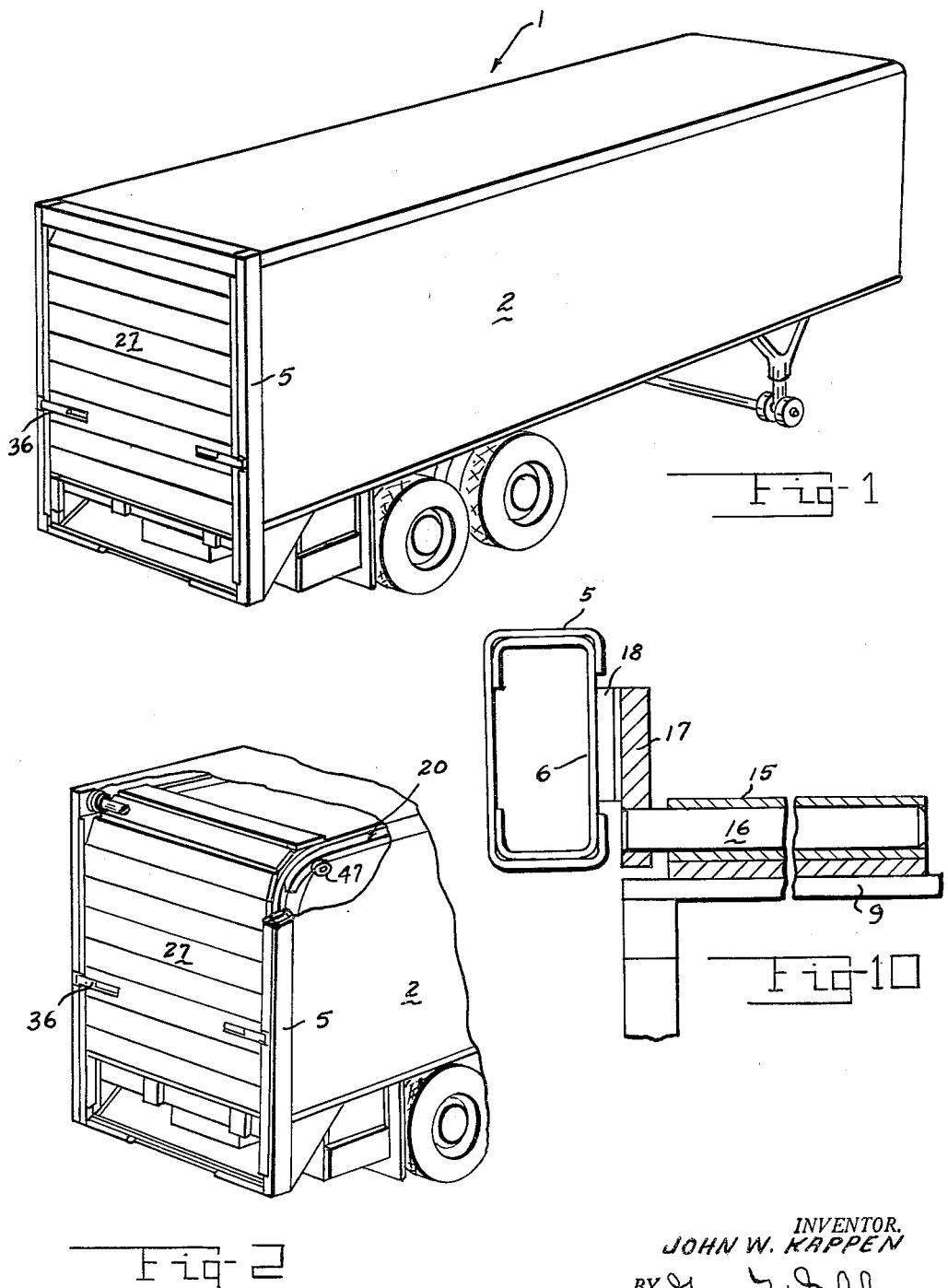
INVENTOR.
JOHN W. KAPPEN
BY Tom Walker
ATTORNEY

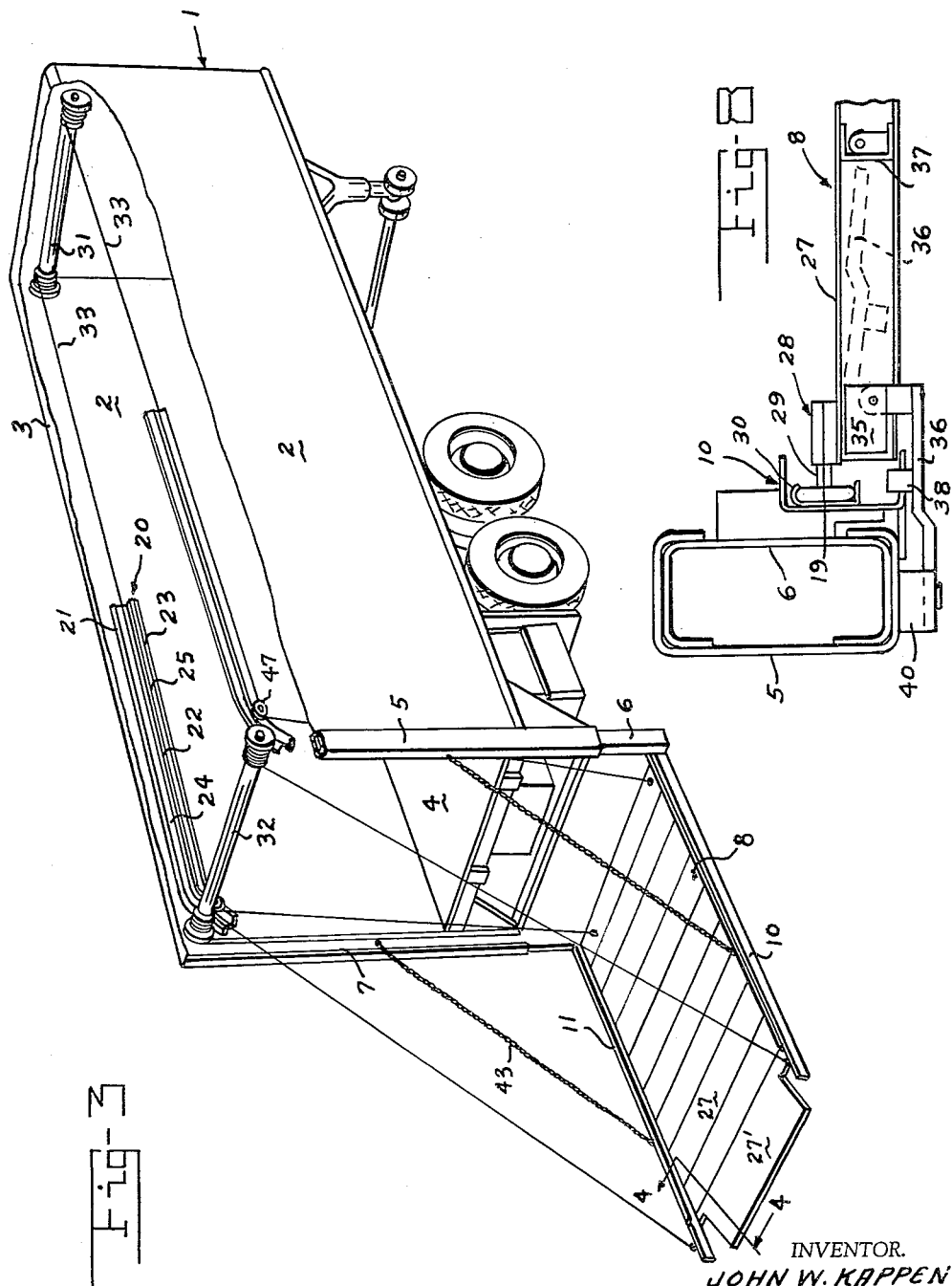

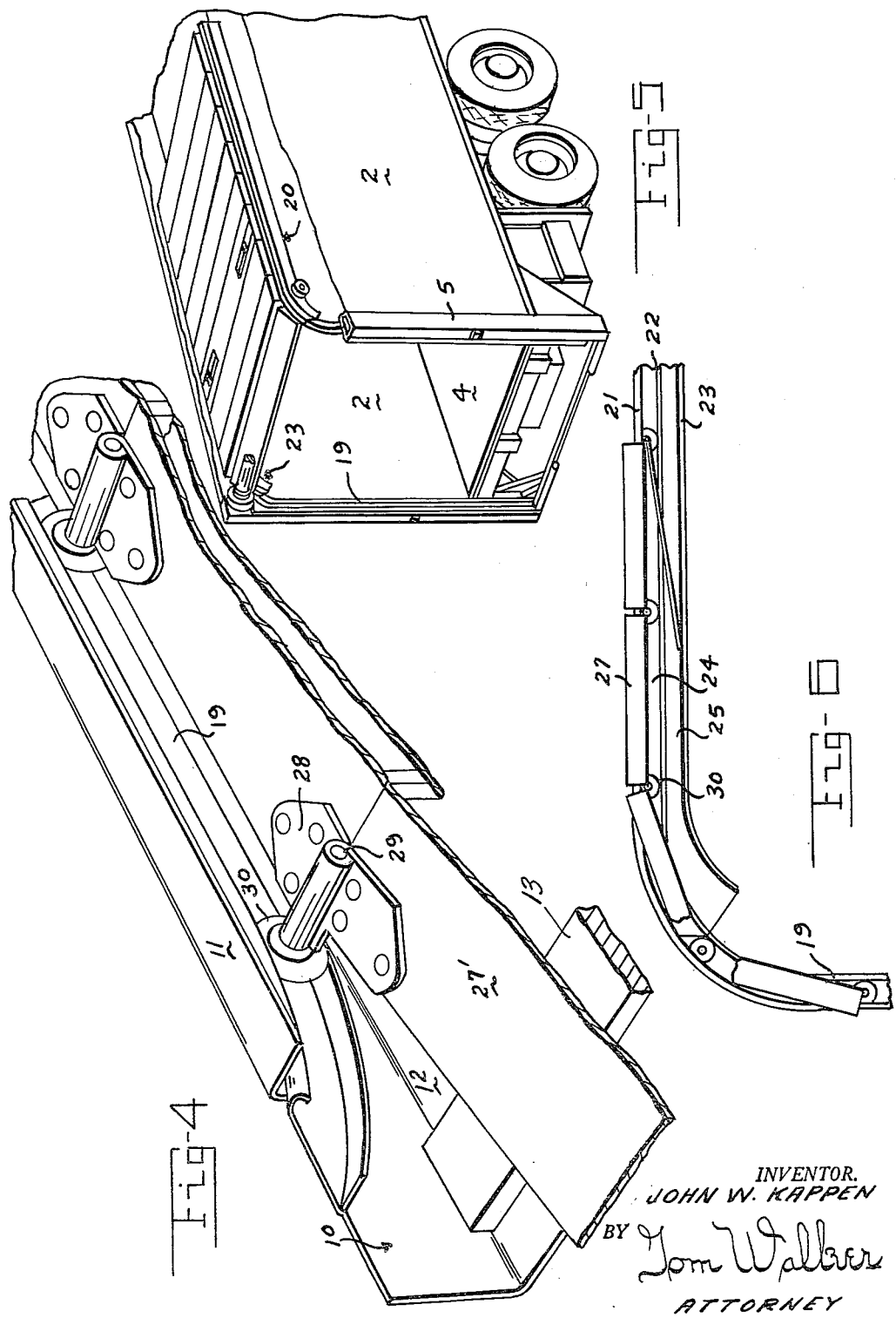

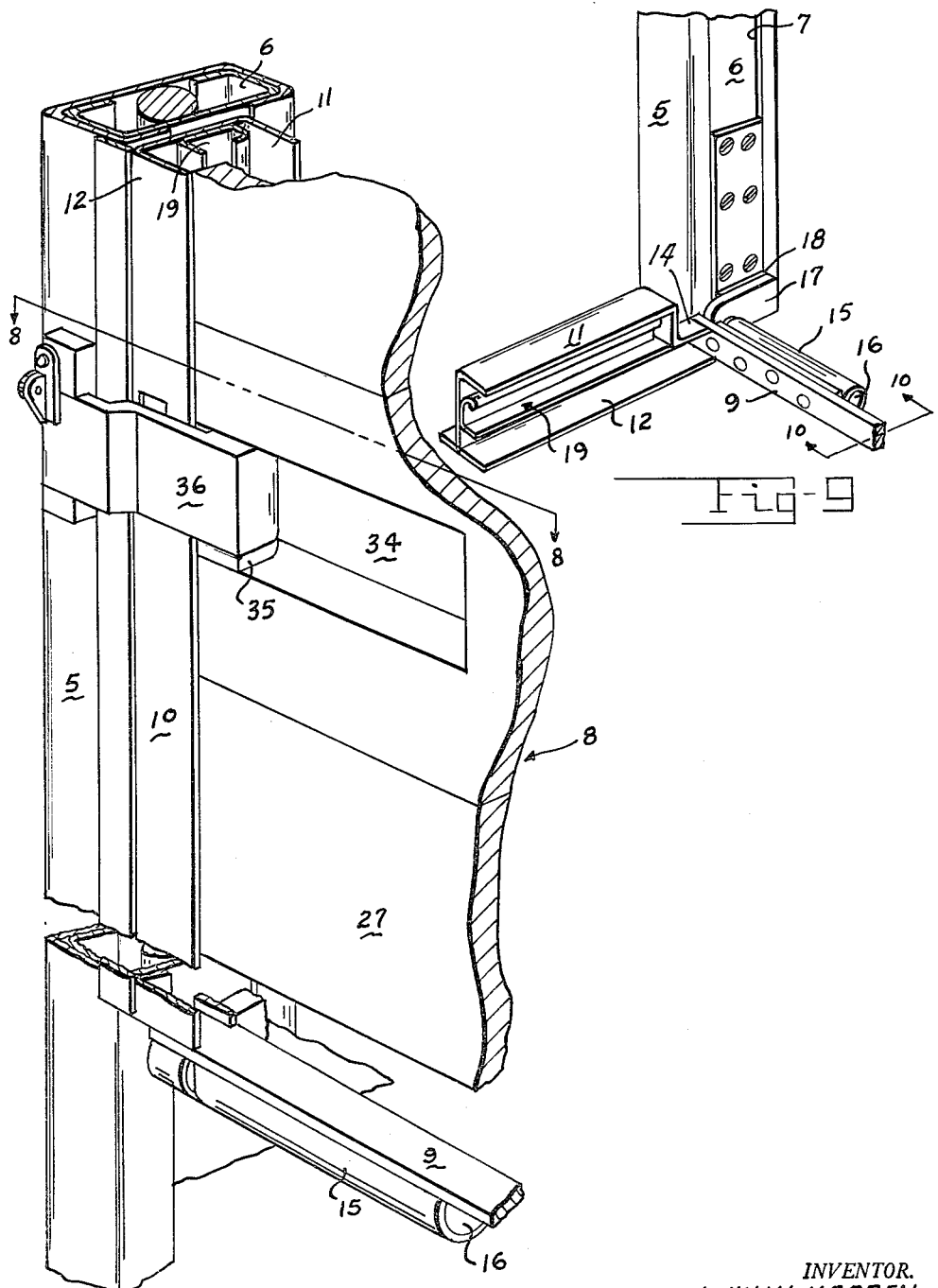

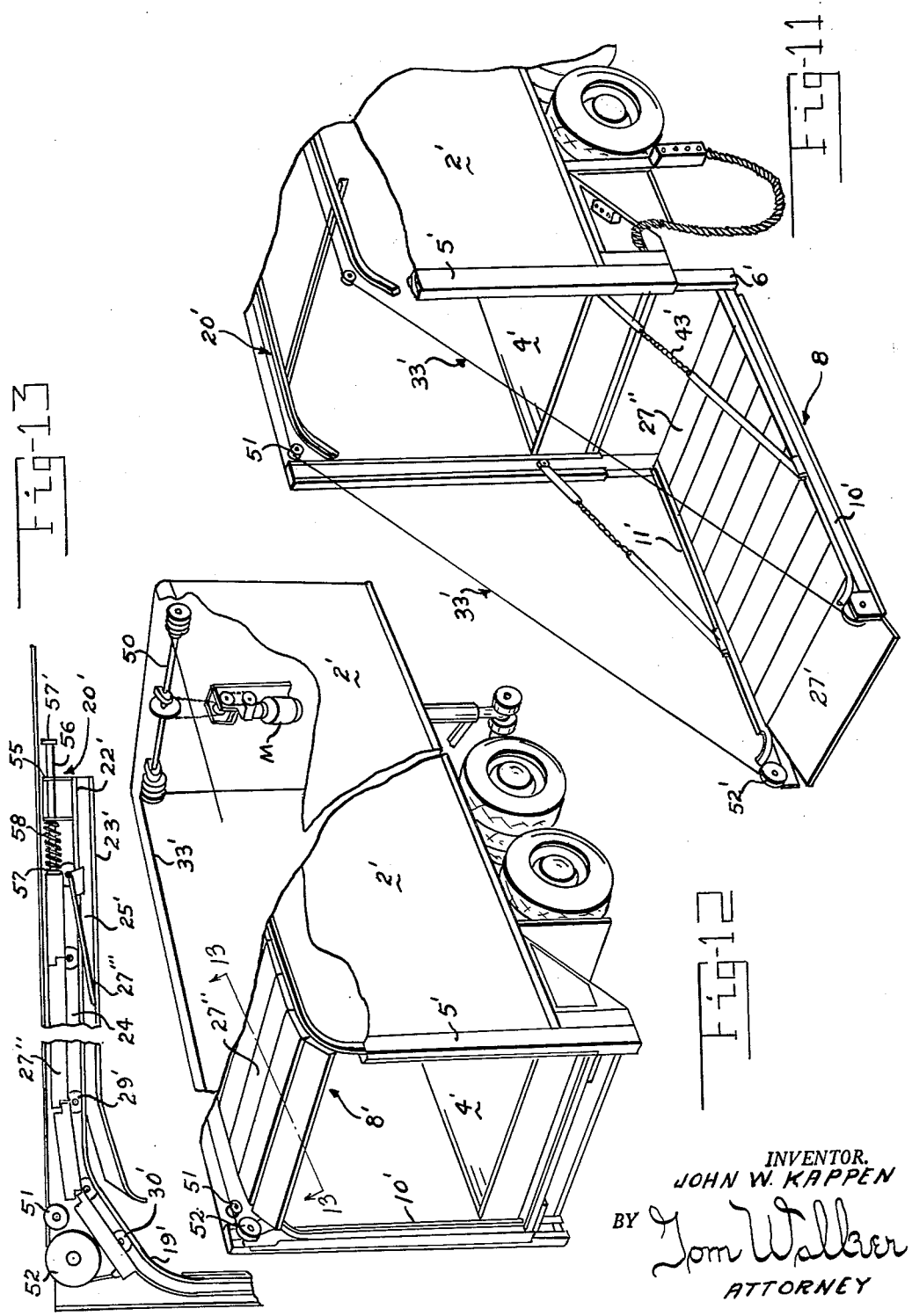

United States Patent Office 3,104,910
Patented Sept. 24, 1963

3,104,910
MATERIAL HANDLING MECHANISM
John W. Kappen, 243 Kenwood Ave., Dayton 5, Ohio
Filed Sept. 1, 1960, Ser. No. 53,421
7 Claims. (Cl. 296—51)

This invention relates to closure apparatus providing improvements in the material handling art. It will be particularly described herein with reference to freight trucks, however, it should be readily apparent therefrom that the application of the invention is not so limited and such is not intended.

The body of a conventional freight truck has one or more openings to provide for loading and unloading freight. Various types of closure units have been employed to seal these openings. By reason of size requirements, most of these closure units are cumbersome, difficult to manipulate and generally interfere with fast and efficient loading and unloading of freight. The present invention is directed to improvements in such closure units providing embodiments which greatly facilitate material handling procedures. A closure unit as provided by the invention is structurally simple, easy to operate, adapted for disposition in a variety of open positions and selectively operable to serve as a closure unit or a ramp whereby to facilitate loading and unloading procedure and material transfer.

A primary object of the invention is to provide closure units particularly advantageous in application to freight trucks which may be economically fabricated, more efficient and satisfactory in use, adaptable to a wide variety of application and unlikely to get out of repair.

A further object of the invention is to provide a novel closure unit which facilitates material handling.

Another object of the invention is to provide novel material handling apparatus which may selectively function as a door type closure unit or a ramp.

An additional object of the invention is to provide a body of a freight truck with means which facilitate loading and unloading thereof.

A further object of the invention is to provide a material possessing the advantageous structural features, the inherent meritorious characteristics and the mode of operation herein mentioned.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, FIG. 1 is a perspective view of a trailer truck incorporating closure apparatus in accordance with the invention;

FIG. 2 is a fragmentary view of the structure of FIG. 1 partly broken away to show details of the closure unit;

FIG. 3 shows the truck of FIG. 1 with the closure unit in a selective open position and parts of the truck body broken away to illustrate details of the invention apparatus;

FIG. 4 is a view taken on line 4—4 of FIG. 3;

FIG. 5 is a fragmentary view similar to that shown in FIG. 2 illustrating the closure unit of the invention opened to an overhead position;

FIG. 6 is a fragmentary cross sectional view of the closure unit of the invention as related to the body of the freight truck on being moved to an overhead position;

FIG. 7 is a fragmentary view in perspective of the closure unit of the invention and the support therefor;

FIG. 8 is a generally schematic cross sectional view taken on line 8—8 of FIG. 7;

FIG. 9 is a fragmentary detailed view of support structure for the closure unit illustrated;

FIG. 10 is a cross sectional view of line 10—10 of FIG. 9;

FIG. 11 is a perspective view of a modified version of the truck shown in FIG. 3;

FIG. 12 is a perspective view of the truck of FIG. 11 with its closure unit in an elevated storage position; and FIG. 13 is an enlarged detail view taken on line 13—13 of FIG. 12.

Like parts are indicated by similar characters of reference throughout the several views.

The invention can be best described with particular reference to the embodiment and application shown in the accompanying drawings. As illustrated, a closure unit in accordance with the invention is incorporated in the body 1 of a trailer truck. The body 1 is conventional, forming a closed chamber having an opening to its rear defined by its vertical sides 2, top 3 and bottom 4. Fixed vertically of the rear extremities of the sides 2 are channel members 5 which are coextensive therewith and projected to depend below the bottom 4.

The members 5 are open to the top and bottom. They contain housing unit 6. Suitable controls are connected to and housed in the units 6 to provide for their conjoint adjustment upwardly or downwardly of the members 5, as required. The details of the units 6 and the controls therefor are not disclosed herein since in and of themselves they constitute no essential feature of the present invention.

The members 5 are formed to have slots 7 the length of their opposite, most adjacent sides to expose opposite surface portions of the units 6. A rectangular closure unit 8 is pivotally connected to its lower end between the lower ends of the units 6 in the area defined by the slots 7 in the channel members 5. The unit 8 is thereby adapted to be selectively disposed between the members 5 to close the opening to the rear of the body 1 or be projected outwardly therefrom.

The unit 8 consists of a frame and a panel section. The frame includes a transverse bar 9 providing its base having a pair of parallel side members 10 projected in generally parallel relation from its respective ends. The members 10 are U-shaped in cross-section and have their parallel flange portions 11 and 12 projected towards each other. The inner sides of the flanges 12, which are outermost with respect to the truck body, are bridged by a bar 13 to their end portions remote from the bar 9. As may be seen from FIG. 9 of the drawings, the base ends of the members 10 which are closed by the bar 9 are relatively contracted to provide a step 14 therein. In addition, the flanges 11 are shorter than the flanges 12 and terminate in the area of the bar 13.

A tube 15 is fixed to the underside of bar 9 to either end. The tubes 15 are axially aligned and respectively accommodate pivot pins 16 fixed at right angles to the outer extremities of plates 17 to be disposed thereby in a plane generally adjacent that defined by the outermost surfaces of members 5. The inner extremities of plates 17 are respectively fixed to the lower ends of the housing units 6 in each member 5 through a block 18 in line with the slot 7 and projecting therethrough. Thus, pins 16 provide the means to pivotally mount the closure unit 8 intermediate the members 5 and connect it for movement with the units 6 thereby.

A generally U-shaped track 19 nests in each member 10 to run substantially parallel and adjacent to its flange 11. It extends from the bar 9 to a point immediately beyond the outer end of the flange 11 where it curves to open in the plane thereof. The curvature of the tracks 19 is in the vicinity of the bar 13 which bridges the flanges 12.

Noting FIG. 3 of the drawings, the truck body 1 has a pair of transversely aligned track units 20 respectively fixed to the inner surfaces of its sides 2 adjacent and parallel to its top 3. Each track unit 20 has three parallel flanges 21, 22 and 23 projected inwardly of the body 1 to define an upper track 24 and a lower track 25 at either side. The lowermost flange 23 is extended to project beyond the upper flanges for purposes to be described. The rearmost ends of the flanges 21–23 adjacent the opening to the rear of the truck are downwardly curved and so oriented that the tracks 24 precisely mate with the tracks 19 on the frame of the unit 8 as this unit is disposed in a vertical position on the body 1 between the members 5.

The panel section of closure unit 8 is an assembly consisting of successively adjacent transversely disposed plates 27 bridging the frame members 10 and having their respective extremities nesting therein. The plates 27 have there respective adjacent extremities pivotally connected by hinges 28. The pivot portion of each hinge 28 includes a pin 29 which projects outwardly beyond the adjacent extremities of the plates 27 to rotatably mount a roller 30 which is contained in the track 19 in the adjacent member 10. The tracks 19 which receive the rollers 30 have their side flanges most adjacent the flanges 11 curved inwardly and over the rollers 30 to contain them to the tracks. It is to be noted that the plate 27' which is most remote from the bar 9 is sufficiently shorter from end to end in a transverse sense beyond its hinge portions 28 to clear the flange portions 11 of the members 10. Plate 27' is thereby adapted to be folded back past the flanges 11 to overlap the adjacent plate 27 in a manner evident from FIG. 6 of the drawings. In its projected position plate 27' offers a projected surface which is inclined to the bar 13 which it abuts.

Mounted in generally parallel relation between the sides 2, respectively to the front and rear of the truck body 1, are spring tensioned roller units 31 and 32. The roller unit 31 which is to the front of the body 1 mounts tension cables 33. The cables 33 extend to the rear of the body 1 adjacent its top 3 where they pass over rollers 47 fixed relative the sides 2 and down to connect to the lowermost plate 27 of the closure unit 8 at its inner surface and adjacent its opposite ends. The roller unit 32 to the rear of the truck is disposed immediately above the arcuate rear extremities of tracks 24 and its tension cables connect to the extremities of the members 10 of the unit 8 remote from the bar 9. The roller 32 applies a tension to the unit 8 to urge it towards a vertical position between the members 5 to close the opening to the rear of the truck body 1. A pair of chains 43 respectively connect between central points on the outermost surfaces of each member 5 and the member 10 of the unit 8 most adjacent thereto for purposes to be described.

FIGS. 1, 2 and 7 of the drawings show the unit 8 in a position closing the opening defined to the rear of the truck body 1. At this time the units 6 are completely contained within the members 5 and the example shown in the panel section of unit 8 is elevated in the frame so its upper plates 27 are disposed in the tracks 24 on the sides of the body 1. The plate 27' is pivoted back and under the adjacent plate 27 to bear on the flanges 23 to either side of the truck body 1.

Latch means are provided for holding the elements of unit 8 in this position. Noting FIGS. 7 and 8 of the drawings, one of the intermediate plates 27 has recesses 34 to either end adjacent the respective flanges 12 of the containing members 10. A latch bar 36 is pivoted to one end to a bracket 35 in and adjacent the outermost extremity of each recess 34. A spring latch 37 fixed in each recess 34 to its intermost extremity is adapted to hold the outer end of the latch bar 36. Each of the outermost faces of the channel members 5 to the rear of the truck body 1 has transversely aligned vertically spaced lugs 40 defining recesses adapted to receive the outer ends of the bars 36 when transversely aligned therewith. This transverse alignment identifies the position of the panel assembly of the unit 8 when it properly closes the opening to the rear of the truck body. At this time the latch bars 36 are released from the spring latches 37 and pivoted over the adjacent members 10 to have their outermost extremities disposed between the spaced lugs 40 and confined therein by latch members 41 pivoted to the confining lugs 40. The latch bars 36 also have lugs 38 projecting from one face which in their latching position project through apertures in the members 10 adjacent thereto. The unit 8 and its panel assembly are relatively fixed thereby between and with respect to members 5.

The preceding indicates the condition of the unit 8 and its components relative the members 5—6 and the truck body 1 when in a position to seal the opening to the rear of the body 1. If it is merely desired that an opening be provided to the rear of the truck, the latch members 41 may be pivoted to disengage the latch bars 36 from their locked position whereupon they may be swung outwardly and back into the recesses 34 to be held in confined relation therein by spring latch members 37. To provide the necessary opening to the body 1 a simple push on the panel assembly confined in the channel members 10 will cause it to smoothly ride up and into the track 24 abetted by the tension applied thereto through the medium of the tension roller unit 31 and the cables 33 which connect to the lowermost plate 27 of the panel assembly. Thus the panel assembly may be displaced from the frame of the unit 8 to a position clearly evident in FIG. 5 of the drawings with great ease.

In the event that loading or unloading conditions require a projected platform or ramp to facilitate loading or unloading operations, the procedure previously noted may be first used for disengaging the latch bars 36 from the members 5. The panel assembly is then lowered so that the uppermost plates 27 of the panel assembly are moved to clear the tracks 24 and be completely disposed between the members 10. At this point one of the latch bars 36 may be grasped to readily pivot the whole unit 8 outwardly from between the members 5 to a position limited by the chains 43 therebetween. This position is generally parallel to the bottom of the truck body 1. Then the controls related to the units 6 may be operated to move them and the connected frame of unit 8 vertically downward of the members 5.

The plate 27' to the outer end of the panel assembly may then be pivoted down to provide a surface inclined to the bar 13 on which it rests. A ramp is provided thereby which on suitable movement of the units 6 may be disposed to form an extension of the floor of the truck body 1 or moved to any other position which may be required to facilitate transfer of freight to or from the truck.

It may be readily seen that a novel and very simply operated closure unit for the truck body 1 is provided which not only facilitates opening and closing of the truck but affords a unique ramp which facilitates freight handling. It should be obvious that the invention provides substantial economies in freight handling procedures.

FIGURES 11–12 show a truck assembly including a closure unit 8' as previously described having simplified controls for moving it to and from a projected ramp position. Here, rather than the tensioned roller units 31 and 32, a single motor driven shaft 50 is mounted transversely of the body 1', on its forward wall adjacent the top 3'. Connected to and wound on either end of the shaft 50 adjacent the respective sides 2' of the body 1' are cables 33'. Cables 33' extend rearwardly of the body in generally parallel relation adjacent its top 3' to pass over pulleys 51 fixed to the upper rear extremities of the sides 2'. From pulleys 51, the respective cable 33' pass over pulleys 52 fixed on the projected extremities of frame members 10' of the closure unit 8' so as to be co-planar with the pulleys 51. Cables 33' pass over and under the pulleys 52 to extend within the channels 10', the length thereof, and anchor to the respective lateral extremities of the bottom plate 27" of the panel section of the closure unit disposed adjacent its base 9'.

This version of the invention thus employs a powered control means for the closure unit. The closure unit 8' will seal the truck body 1' in a position as indicated in FIG. 2 of the drawings with reference to the first described embodiment. To lift the panel section of the closure unit in this instance one need only energize a motor M which drives the shaft 50 to take up cables 33' which are connected to the lowermost plate of the panel section. The entire panel section will be moved thereby to a position as seen in FIG. 13 of the drawing. Shock absorbing units 54 obviously cushion the effect of the panel section reaching its terminal stored position in the tracks 24' and 25' and store energy in the process.

To then move the entire closure unit to a projected or ramp position, the motor M will be energized to drive the shaft 50 in a reverse direction. This will play out the cables 33' to permit the movement of the panel section back into the tracks 19' in the frame of the closure unit. Displacement of the panel section is insured on release of the cable 33' by the energy previously stored in the springs 58 of the shock absorbing units 54 in a manner believed obvious. Thus, a smooth and automatic projection of the panel section from the top of the truck body 1' is readily effected on release of the cables 33'.

The whole closure unit 8' is then lowered until the panel section completely clears the track 24' as in the instance of the first described embodiment of the invention whereupon the shaft 50 may be further energized to play out the cables 33' and permit the entire closure unit 8' to swing outward to a horizontally projected position. This horizontal position is determined by the chains 43' as indicated in FIG. 11 of the drawings. To close the truck body once more, the motor M may be energized to drive the shaft 50 to take up cables 33' which will automatically elevate the entire closure unit 8' to a vertical position between the members 6'. Following this, the controls related to the units 6' as previously described may be operated to move them and the connected frame of the unit 8' vertically upward to the point where the tracks 19' on the closure unit mate with the tracks in the top of the truck body 1 to permit the panel section to be moved upward in an obvious manner under the influence of cables 33' to provide the proper orientation thereof in the desired position closing the opening to the rear of the truck body 1.

It may be seen that the invention embodiment illustrated in FIGS. 11–13 of the drawings offers a little more flexibility and convenience in the operation of the closure unit as compared to the first embodiment illustrated. It will of course be obvious that other refinements of the controls may be made without departing from the spirit and the principles of the invention.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. A truck or the like including a body having an opening, a frame defining said opening, guide means on said frame, guide means in said truck forming a continuation of the guide means on said frame, closure means operatively connected to said guide means for movement to and from said frame to selectively close or open said opening, and means connecting said frame to said truck for movement vertically thereof to selectively position said frame and closure means with respect to the opening.

2. A truck or the like including a body having an opening, a frame defining said opening, guide means on said frame, guide means on said truck forming a continuation of the guide means on said frame, closure means operatively connected to said guide means for movement to or from said frame to selectively close or open said opening and means for pivoting said frame and closure means outwardly from said truck body to define a ramp leading to said opening.

3. A truck or the like including a body having an opening, a frame defining said opening, guide means on said frame, guide means in said truck forming a continuation of the guide means on said frame, closure means operatively connected to said guide means for movement to and from said frame to selectively close or open said opening, means connecting said frame to said truck for movement vertically thereof to selectively position said frame and closure means, and means for pivoting said frame and closure means outwardly from said truck body to define a ramp leading to said opening.

4. A truck or other storage unit including a body providing a housing, an opening in said housing, a frame defining said opening, guide means on said frame, guide means in said truck forming a continuation of the guide means on said frame, closure means operatively connected to said guide means for movement to and from said frame to selectively close or open said opening, said closure means having power driven means connected to control its movement to and from said frame, said power driven means being also operatively connected to said frame to provide for displacement of said frame and closure means with reference to said housing.

5. A truck or similar storage unit having an opening in the body thereof including a frame defining said opening, guide means on said frame, guide means on said truck forming a continuation of the guide means on said frame, closure means operatively connected to said guide means for movement to and from said frame to selectively close or open said opening, resilient means at the terminal points of the guide means on said truck to cushion the movement of closure means therein and operative to store energy to project said closure means from the guide means on said truck, power driven cables connecting between the truck body and the lowermost portion of said closure means, and means on said truck body and the uppermost portion of said frame for guiding said cables, said frame being pivotally related to said truck body at the lowermost portion thereof, said power driven cables being operative to effect the movement of said closure means to the guide means on said truck to store energy in said resilient means on engagement thereto and said cable means being releasable for movement of said closure means into said guide means on said frame under the influence of said resilient means and to provide for horizontal projection of said closure means relative said truck.

6. In a storage unit, means defining an access opening thereto, guide means in said storage unit leading to said opening, a frame having a nesting position in said opening, guide means supported on said frame forming an extension of the guide means in said storage unit when said frame is in nesting position within said opening, closure means filling said frame and slidably supported within the guide means thereon for movement from said frame supported guide means to said storage unit guide means, and means providing a selective inclination of said frame and closure means relative said storage unit opening to provide a ramp thereto.

7. A structure as set forth in claim 6, characterized by means for raising and lowering said frame and closure means relative said access opening when said frame and closure means are inclined outwardly relative said opening.

References Cited in the file of this patent
UNITED STATES PATENTS

| | | |
|---|---|---|
| 534,652 | Lantz | Feb. 26, 1895 |
| 1,729,825 | Gaiser | Oct. 1, 1929 |
| 2,142,562 | Greegor et al. | Jan. 3, 1939 |
| 2,200,436 | Van Blarcom et al. | May 14, 1940 |
| 2,323,807 | Ferris et al. | July 6, 1943 |
| 2,653,845 | Benjamin | Sept. 29, 1953 |
| 2,783,080 | Ringsby | Feb. 26, 1957 |

FOREIGN PATENTS

| | | |
|---|---|---|
| 383,685 | Great Britain | Nov. 24, 1932 |